United States Patent [19]
Duff et al.

[11] Patent Number: 5,645,965
[45] Date of Patent: Jul. 8, 1997

[54] SYMMETRICAL PERYLENE DIMERS

[75] Inventors: James M. Duff, Mississauga; Charles G. Allen, Waterdown; Ah-Mee Hor; Gordon K. Hamer, both of Mississauga, all of Canada

[73] Assignee: Xerox Corporation, Stamford, Conn.

[21] Appl. No.: 700,326

[22] Filed: Aug. 8, 1996

[51] Int. Cl.[6] .......................... G03G 5/06; G03G 5/047
[52] U.S. Cl. .................................. 430/59; 430/78
[58] Field of Search .......................... 430/59, 78

[56] References Cited

U.S. PATENT DOCUMENTS

| | | | |
|---|---|---|---|
| 3,871,882 | 3/1975 | Wiedemann | 96/1.5 |
| 3,904,407 | 9/1975 | Regensburger et al. | 96/1.5 |
| 3,972,717 | 8/1976 | Wiedemann | 96/1.5 |
| 4,419,427 | 12/1983 | Graser et al. | 430/58 |
| 4,501,906 | 2/1985 | Spietschka et al. | 549/232 |
| 4,555,463 | 11/1985 | Hor et al. | 430/59 |
| 4,587,189 | 5/1986 | Hor et al. | 430/59 |
| 4,709,029 | 11/1987 | Spietschka et al. | 544/125 |
| 4,937,164 | 6/1990 | Duff et al. | 430/58 |
| 5,019,473 | 5/1991 | Nguyen et al. | 430/58 |
| 5,589,309 | 12/1996 | Suzuki et al. | 430/59 |
| 5,589,314 | 12/1996 | Etoh et al. | 430/59 |

*Primary Examiner*—John Goodrow
*Attorney, Agent, or Firm*—E. O. Palazzo

[57] ABSTRACT

Photoconductive imaging members comprised of a symmetrical dimeric perylene as a charge generator, wherein said perylene is of the following formula wherein R is hydrogen, alkyl, cycloalkyl, oxaalkyl, substituted alkyl, aryl, substituted aryl, aralkyl or substituted aralkyl, and X is the symmetrical bridging moiety, N—N, alkylene, when n is zero, substituted alkylene, cycloalkylene, arylene, substituted arylene, aralkylene, or substituted aralkylene.

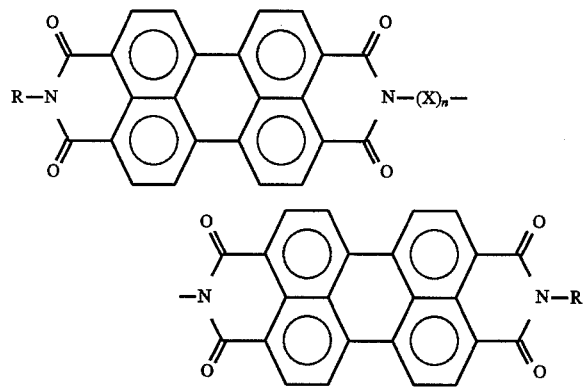

83 Claims, No Drawings

SYMMETRICAL PERYLENE DIMERS

BACKGROUND OF THE INVENTION

The present invention is directed generally to dimeric perylene pigments, and more specifically, to symmetrical perylene bisimide dimers of the formulae

FORMULA 1

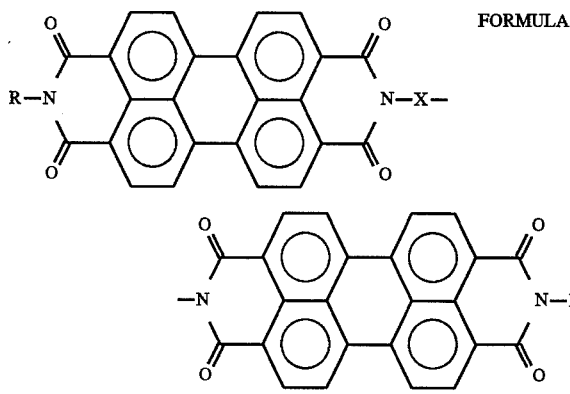

wherein R is hydrogen, alkyl, cycloalkyl, oxaalkyl, substituted alkyl, aryl, substituted aryl, aralkyl or arylalkyl, substituted aralkyl or arylalkyl, and the like, and X is a symmetrical bridging moiety such as a single N—N bond, that is no X is present, alkylene, substituted alkylene, cycloalkylene, arylene, substituted arylene, aralkylene, substituted aralkylene, and the like. Alkylene includes components with from 1 to about 25, and preferably from 1 to about 10 carbon atoms, such as ethylene, trimethylene, tetramethylene, pentamethylene, hexamethylene, octamethylene, dodecamethylene, and the like. Alkylene can be substituted with known effective groups such as alkyl, like methyl, alkoxy and the like. Arylene includes components with from 6 to about 24 carbon atoms such as 1,3- and 1,4-phenylene, 1,4-, 1,5-, 1,6- and 2,7-naphthylene, and the like, and which aryl can be substituted with, for example, alkyl, such as methyl, ethyl and the like. Aryl and the other substituents mentioned are known and also in embodiments are as more specifically illustrated herein, but not necessarily limited to such substituents. Embodiments of the present invention include a process for the preparation of the symmetrical perylene bisimide dimer pigments in high yield and high purity, which process comprises the reaction of an excess, preferably about two parts of a perylene monoimido anhydride of the following Formula 2, with a symmetrical diamine in a high boiling solvent, such as N-methylpyrrolidine, and washing the resultant product after cooling to remove residual starting components and other byproducts.

FORMULA 2

Perylene Monoimido Anhydride

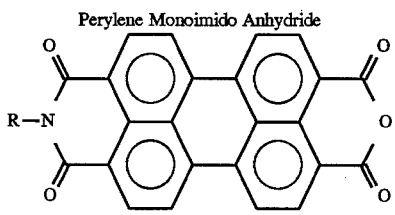

wherein R represents the groups or substituents as illustrated with reference to Formula 1.

The perylene dimer pigments can be selected as a photoactive component in photoconductive imaging members used in electrophotographic printing process. Moreover, in embodiments these pigments can be selected as a colorant in polymeric composite materials such as plastic objects, xerographic toners, and the like. Important embodiments of the present invention include photoconductive imaging members comprised of a supporting substrate, a photogenerating layer comprised of the perylene dimer pigments illustrated herein of Formula 1 and a charge transport layer. Furthermore, the perylene dimer pigments are highly colored and can be prepared with a variety of hues such as orange, red, magenta, maroon, brown, black, greenish black, and the like depending, for example, on the R and X-substituents With the present invention in embodiments photoconductive imaging members with the perylene dimer pigments obtained by, for example, coupling two perylene monomers together via a bridging group (X in Formula 1) enable a number of advantages with respect, for example, to photoconductive imaging members with monomeric perylene pigments. Furthermore, the color of the invention perylene dimers can be significantly different from the corresponding monomeric perylenes. For example the dimer of Formula 1 wherein R=n-pentyl and X=1,3-propylene possesses higher photosensitivity and broader white light spectral response than the related monomeric perylene pigments (typified by general Formula 3a) with two pentyl or two propyl groups Furthermore, the dimer appears greenish black whereas the corresponding perylene monomers are, respectively, reddish brown and reddish black in color.

Additionally, the invention perylenes of Formula 1 can be selected, it is believed, as a component for solid state devices such as in solar cells, chemical sensors, or electroluminescent devices, and the aforementioned perylene pigments can, it is believed, be selected as dispersed colorants for plastics and coatings.

In embodiments, the present invention is directed to photogenerating pigments comprised of symmetrical perylene bisimide dimers. Embodiments of the present invention are directed to an imaging member comprised of a supporting substrate, a photogenerating layer comprised of a symmetrical perylene dimer of Formula 1, and more specifically, wherein where R=n-pentyl and X=1,3-propylene, R=n-propyl and X=ethylene, R=n-butyl and X=1,4-phenylene, and the like, and a charge, especially hole, transport layer. More specifically, the symmetrical perylene dimers of the present invention are comprised of two identical perylene bisimide molecules wherein the two perylene moieties are joined by a N—N bond or a symmetric alkylene, a symmetric cycloalkylene, a symmetric arylene or a symmetric aralkylene bridging group, such as 1,3-propylene, trans-1,4-cyclohexylene, 1,4-phenylene, meta-xylylene, and the like. The perylenes of the present invention can be characterized as having a center or plane of symmetry. Imaging members with the photogenerating pigments of the present invention are sensitive to wavelengths of from about 400 to about 700 nanometers, that is throughout the visible region of the light spectrum. In embodiments thereof, the imaging members of the present invention generally possess broad spectral response to white light and stable electrical properties over long cycling times as illustrated herein. Many of the symmetrical perylene bisimides dimers of the present invention, when selected as photogenerator pigments, exhibit excellent charge acceptance of about 800 volts surface potential in a layered device, dark decay of less than about 50 volts per second, for example 35 to 45, excellent dispersibility and low solubility in typical coating compositions, such as solutions of certain polymers in organic solvents, such as methylene chloride, selected for the preparation of layered photoresponsive imaging members.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The selection of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyl diimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978) There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Further, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a nonhalogenated perylene pigment photogenerating component. Both of the aforementioned patents disclose an aryl amine component as a hole transport layer.

Moreover, there are disclosed in U.S. Pat. No. 4,419,427 electrographic recording mediums with a photosemiconductive double layer comprised of a first layer containing charge carrier perylene diimide dyes, and a second layer with one or more compounds which are charge transporting materials when exposed to light, reference the disclosure in column 2, beginning at line 20.

The two general types of monomeric perylene pigment, illustrated as follows are commonly referred to as perylene bis(imides) and bis(imidazo)perylenes.

FORMULA 3

Photoconductive Perylene Pigments from Perylene-3, 4, 9, 10-tetracarboxylic Acid Dianhydride

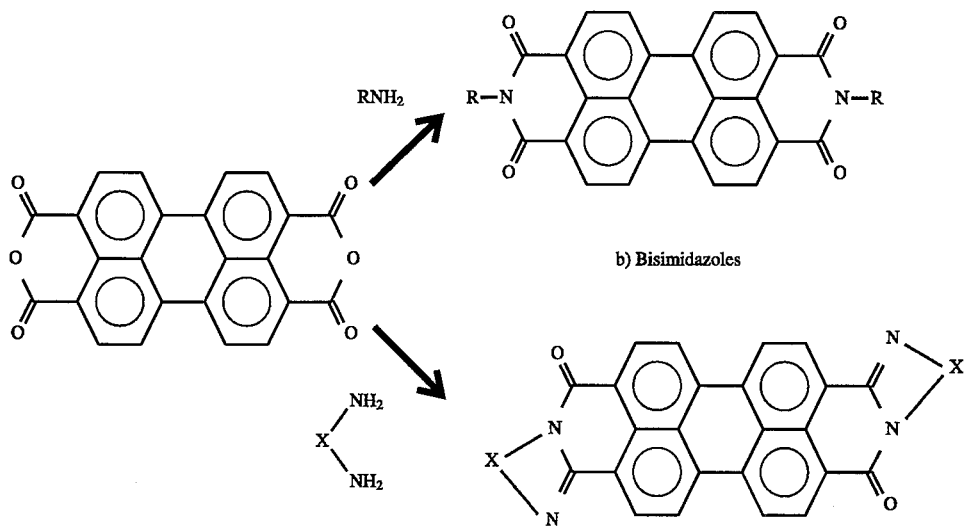

a) Bisimides b) Bisimidazoles

These perylenes can be prepared by reacting perylene tetracarboxylic acid dianhydride with primary amines or with diamino-aryl or -alkyl compounds. Their use as photoconductors is disclosed in U.S. Pat. No. 3,871,882, the disclosure of which is totally incorporated herein by reference, and U.S. Pat. No. 3,904,407. The '882 patent discloses the use of the perylene dianhydride and bisimides in general (Formula 3a, R=H, lower alkyl (C1 to C4), aryl, substituted aryl, aralkyl, a heterocyclic group or the NHR' group in which R' is phenyl, substituted phenyl or benzoyl) as vacuum evaporated thin charge generation layers (CGLs)

in photoconductive devices coated with a charge transporting layer (CTL). The '407 patent, the disclosure of which is totally incorporated herein by reference, illustrates the use of bisimide compounds (Formula 3a, R=alkyl, aryl, alkylaryl, alkoxyl or halogen, or heterocyclic substituent) with preferred pigments being R=chlorophenyl or methoxyphenyl. This patent illustrates the use of certain vacuum evaporated perylene pigment or a highly loaded dispersion of pigment in a binder resin as CGL in layered photoreceptors with a CTL overcoat or, alternatively, as a single layer device in which the perylene pigment is dispersed in a charge transporting active polymer matrix. The use of purple to violet dyestuffs with specified chromaticity values, including bisimidazo perylenes, specifically cis and trans bis (benzimidazo)perylene (Formula 3b, X=1,2-phenylene) and bis(1,8-naphthimidazo)perylene (Formula 3b, X=1,8-naphthylene), is disclosed in U.S. Pat. No. 3,972,717. This patent also describes the use of vacuum-evaporated CGLs in layered photoconductive devices. The use of a plurality of pigments, inclusive of perylenes, in vacuum evaporated CGLs is illustrated in U.S. Pat. No. 3,992,205.

U.S. Pat. No. 4,419,427 describes the use of highly-loaded dispersions of perylene bisimides, with bis(2,6-dichlorophenylimide) being a preferred material, in binder resins as CGL layers in devices overcoated with a charge transporting layer such as a poly(vinylcarbazole) composition. U.S. Pat. No. 4,429,029 illustrates the use, in devices similar to those of the previous patent, of bisimides and bisimidazo perylenes in which the perylene nucleus is halogenated, preferably to an extent where 45 to 75 percent of the perylene ring hydrogens have been replaced by halogen. U.S. Pat. No. 4,587,189, the disclosure of which is totally incorporated herein by reference, describes layered photoresponsive imaging members prepared using highly-loaded dispersions or, preferably, vacuum evaporated thin coatings of cis- and trans-bis(benzimidazo)perylene (1, X=1,2 phenylene) and other perylenes overcoated with hole transporting compositions comprised of a variety of N,N, N',N'-tetraaryl-4,4'-diaminobiphenyls. U.S. Pat. No. 4,937,164 illustrates the use of perylene bisimides and bisimidazo pigments in which the 1,12- and/or 6,7 position of the perylene nucleus is bridged by one or 2 sulfur atoms wherein the pigments in the CGL (charge generating layer) layers are either vacuum evaporated or dispersed in binder resins in similar devices incorporating tetraaryl biphenyl hole transporting molecules.

While the above described layered perylene-based photoreceptors, or photoconductive imaging members may exhibit desirable xerographic electrical characteristics, most of the bisimides are red to brown in color, and possess, it is believed, relatively poor spectral response, particularly to the 600 to 700 nanometers region of the spectrum. The majority of the bis(imidazo) pigments, especially those with a purple to violet color, have poor spectral response in the blue (400 to 450 nanometers) region of the spectrum. Ideally, a photoconductive pigment used for light lens imaging, particularly for color photocopying, should have a uniform spectral response, that is be panchromatic throughout the visible spectrum from 400 to 700 nanometers. EU 40,402 (Wiedemann, Hoechst) discloses as a possible photogenerator a dark crystal form of bis(3-methoxypropylimido)perylene (4a, R=CH$_3$OCH$_2$CH$_2$—) which provided spectral response from just over 400 to above 650 nanometers. U.S. Pat. No. 4,517,270 illustrates bisimides with propyl, hydroxypropyl, methoxypropyl and phenethyl substituents (4a, R=CH$_3$CH$_2$CH$_2$—, HOCH$_2$CH$_2$CH$_2$—, CH$_3$OCH$_2$CH$_2$CH$_2$—, and C$_6$H$_5$CH$_2$CH$_2$—) which are black or dark primarily because of their crystal properties, and perylene pigments which are nuclearly substituted with anilino, phenylthio, or p-phenylazoanilino groups. Pigments of these type were indicated as providing "good electrophotographic recording media with panchromatic absorption characteristics. Similarly, in U.S. Pat. Nos. 4,719,163 and 4,746,741 the pigment, N,N'-bis(2-(3-methylpheny)ethyl)perylene-3,4,9, 10-bis(dicarboximide) (1a, R=3-methyl-C$_6$H$_5$CH$_2$CH$_2$—) is indicated as providing layered electrophotographic devices having spectral response to beyond 675 nanometers.

Perylene pigments which are unsymmetrically substituted have also been used as CGL (charge generating layers) materials in layered photoreceptors. The preparation and applications of these pigments, which can be either bis (imides) in which the imide nitrogen substituents (R in Formula 3a) are different or have monoimide-monoimidazo structures (i.e. one half of the molecule has the 3a type structure and the other half has the 4b type structure) is described in U.S. Pat. Nos. 4,501,906; 4,709,029 and 4,714, 666. U.S. Pat. No. 4,968,571 discloses the use of a large variety of unsymmetrically substituted perylenes with one phenethyl radical bonded to the imide nitrogen atom. It is disclosed that the use of mixtures of two or more of these pigments in dispersion CGLs affords devices having excellent photosensitivity and resistance to abrasion.

Two additional patents relating to the use of perylene pigments in layered photoreceptors are U.S. Pat. No. 5,019, 473, which illustrates a grinding process to provide finely and uniformly dispersed perylene pigment in a polymeric binder with excellent photographic speed, and U.S. Pat. No. 5,225,307, the disclosure of which is totally incorporated herein by reference, which discloses a vacuum sublimation process which provides a photoreceptor pigment, such as bis(benzimidazo)perylene (3b, X=1,2-phenylene) with superior electrophotographic performance.

The following patents, the disclosures of which are totally incorporated herein by reference, relate to the use of perylene compounds, either as dissolved dyes or as dispersions in single layer electrophotographic photoreceptors usually based on sensitized poly(vinyl carbazole) compositions: U.S. Pat. Nos. 4,469,769; 4,514,482; 4,556,622; and Japanese JP 84-31,957, -119,356, -119,357, -140,454, -140, 456, -157,646, -157,646, and -157,651.

Although known imaging members are suitable for their intended purposes, a need remains for imaging members containing improved photogenerator pigments. In addition, a need exists for imaging members containing photoconductive components with improved xerographic electrical performance including higher charge acceptance, lower dark decay, increased charge generation efficiency and charge injection into the transporting layer, tailored PIDC curve shapes to enable a variety of reprographic applications, reduced residual charge and/or reduced erase energy, improved long term cycling performance, and less variability in performance with environmental changes in temperature and relative humidity. There is also a need for imaging members with photoconductive components comprised of certain symmetrical dimeric perylene photogenerating pigments with enhanced dispersibility in polymers and solvents. There is also a need for photogenerating pigments which permit the preparation of coating dispersions, particularly in dip-coating operations, which are colloidally stable and wherein settlement is avoided or minimized, for example little settling for a period of from 20 to 30 days in the absence of stirring. Further, there is a need for photoconductive materials with enhanced dispersibility in polymers and solvents that enable low cost coating processes in the manufacture of photoconductive imaging members. Additionally, there is a need for photoconductive materials that enable imaging members with enhanced photosensitivity in the red region of the light spectrum enabling the resulting imaging members thereof to be selected for imaging by red diode and gas lasers. Furthermore, there is a need for photogenerator pigments with spectral response in the green and blue regions of the spectrum to enable imaging by newly emerging blue and green electronic imaging light sources. A need also exists for improved panchromatic pigments with broad spectral response from about 400 to 700 nanometers for color copying using light-lens processes. There also is a need for photogenerating pigments which can be readily prepared from commercially available reactants, and a need for preparative processes and purification techniques which provide highly pure pigment with outstanding xerographic electrical performance without recourse to expensive and time consuming post-synthetic purification methods such as solvent extraction or vacuum sublimation.

SUMMARY OF THE INVENTION

Examples of objects of the present invention include:

It is an object of the present invention to provide symmetrical perylene bisimide dimers and imaging members thereof with many of the advantages illustrated herein.

It is another object of the present invention to provide imaging members with novel photoconductive components with improved photoconductivity.

Additionally, in another object of the present invention there are provided symmetrical perylene bisimide dimers suitable for use as dispersed colorants in polymeric composites and as photogenerator pigments in layered photoconductive imaging devices without purification of the dimers; symmetrical perylene bisimide dimers comprised of two identical perylene moieties joined together by a symmetrical bridging group; processes for the preparation of dimeric pigments from readily available starting materials; and processes for the purification of dimers which enable photoelectrically stable materials for their selection as photogenerator pigments in photoconductive imaging devices, or members.

It is another object of the present invention to provide photoconductive imaging members with symmetrical perylene dimer photogenerating pigments with the formulas illustrated herein, and that enable imaging members with improved photosensitivity in the wavelength region of light spectrum, such as from about 400 to about 700 nanometers, or wherein said pigments are perylene wherein two perylene nucleii are linked together by imide nitrogens.

It is another object of the present invention to provide the pigments which can possess a variety of colors such as magenta, red, brown, black, green, and the like; the color is dependent primarily on the types of terminal and bridging groups present.

Still another object of the present invention relates to the provision of novel compounds, and more specifically, compounds of the formulas illustrated herein.

Another object of the present invention relates to the preparation of symmetrical perylene dimer photogenerating pigments having structures illustrated in or encompassed by Formula 1, or symmetrical perylene dimers wherein the terminal groups are equivalent, such as alkylimides, and the linking X group is alkyl, aralkyl, substituted aryl, and the like.

These and other objects of the present invention are accomplished in embodiments by the provision of layered imaging members comprised of a supporting substrate, a photogenerating layer comprised of photogenerating pigments comprised of symmetrical perylene bisimide dimers, such as those encompassed by Formula 1, and more specifically, wherein R is hydrogen, n-pentyl, n-propyl, phenyl, cyclohexyl, 3-methoxypropyl, 6-hydroxyhexyl and the like, and X is a single nitrogen-nitrogen bond or a symmetrical alkylene, cycloalkylene, arylene or aralkylene bridging group such as 1,3-propylene, 1,5-pentamethylene, 1,4-phenylene, meta-xylylene and the like.

Alkylene X-groups include aliphatic, especially alkylene with from 2 to about 25 carbon atoms, such as ethylene, 1,3-propylene, 2-methyl-1,3-propylene, 2,2-dimethyl-1,3-propylene, 2-hydroxy-1,3-propylene, 1,4-, and 2,3-tetramethylene, 1,5- and 2,4-pentamethylene, 1,6-, 2,5- and 3,4-hexamethylene, hepta-, octa-, nona-, deca-, undeca-, dodeca-, pentadeca- and eicosa-methylene, and branched and symmetrical isomers thereof, and the like. Cycloalkylene groups include cis- and trans-1,3-cyclobutylene, cis and trans-1,3-cyclopentylene, and cis- and trans-1,3- and 1,4-cyclohexane. Arylene includes symmetrical aromatics such as those with from 6 to about 24 carbon atoms such as 1,3- and 1,4-phenylene, 1,4-, 1,5-, 2,6- and 2,7-naphthylylene, 1,4-anthracenylene 4,4'-, and 3,3'-biphenylene, 4,4'-diphenylsulfone and the like. Aralkyl includes those moieties with from about 8 to about 30 carbon atoms such as 1,2-, 1,3- and 1,4-xylylene where the perylene moieties are bridged by connection to the methyl substituents, and the like. The preferred groups for each are: R=methyl, ethyl, n-propyl, n-butyl, isobutyl, n-pentyl, 2- and 3-methylbutyl, n-hexyl, n-heptyl and n-octyl, isobutyl, cyclopentyl, cyclohexyl, neopentyl, 3-methoxypropyl, 6-hydroxyhexyl, phenyl, benzyl, 3-chlorobenzyl and phenethyl; X=ethylene, 1,3-propylene, 2-methyl-1,3-propylene, 2,2-dimethyl-1,3-propylene, 1,4-tetramethylene, 1,5-pentamethyleneyl, 1,6-hexamethylene, 1,7-heptamethylene and 1,8-octamethylene, 1,4-phenylene, 4,4'-biphenylene, 1,3-xylylene, and 1,5-naphthylene.

Oxaalkyl includes 3-methoxy propyl and the like; substituted alkyl includes nitro or cyano alkyl like nitroethyl; substituted aryl includes chlorophenyl and the like; arylalkyl includes benzyl and the like; substituted aralkyl includes chlorobenzyl and the like; and for X substituted alkylene includes 2-methoxy 1,3-propylidene and the like; cycloalkylene includes 1,4-cyclohexylidene and the like; arylene includes 1,4-phenylene and the like; substituted arylene includes 3,3-dimethyl 4,4-biphenylene and the like; substituted aralkylene includes 5-methoxy 1,3-xylylidene and the like. Preferred R is alkyl, such as n-pentyl, and the preferred X is alkylene, such as 1,3-propylene.

Examples of specific symmetrical perylene dimer pigments of the present invention include those where R is hydrogen, methyl, ethyl, n-propyl, isopropyl, cyclopropyl, cyclopropylmethyl, n-butyl, isobutyl, sec-butyl, cyclobutyl n-pentyl, 2-pentyl, 3-pentyl, 2-(3-methyl)butyl, 2-methylbutyl, 3-methylbutyl, neopentyl, cyclopentyl, n-hexyl, 2-ethylhexyl, cyclohexyl, n-heptyl, cycloheptyl, n-octyl, cyclooctyl, n-nonyl, n-decyl, n-undecyl, n-dodecyl, phenyl, benzyl, phenethyl and substituted phenyl, benzyl and phenethyl radicals in which the aromatic ring contains from 1 to 5 substituents inclusive of fluorine, chlorine, bromine, iodine, methyl, hydroxymethyl, trifluoromethyl, tertiary-butyl, tertiary-butoxy, methoxy, trifluoromethoxy, nitro, cyano, dimethylamino, diethylamino, and the like, and X represents a nitrogen-nitrogen bond Specific examples of photogenerating symmetric perylene bisimide dimers of the present invention include those encompassed by Formula 1 wherein R=n-propyl and X=1, 3-propylene, R=n-propyl and X=4,4'-biphenyl, R=phenethyl and X=1,3-propylene, R=n-pentyl and X=1,3-propylene, R=n-butyl and X=1,3-propylene, R=isobutyl and X=1,3-propylene, R=2-methylbutyl and X=1,3-propylene, R=3-methylbutyl and X=1,3-propylene, R=n-propyl and X=a N—N bond, that is no X substitutent is present, thus X is represented by $(X)_n$ wherein n is the number zero (0); for $(X)_n$, n is the number zero, that is no X group is present and an N—N bond exists, and n is a number, preferably 1, when an X group such as alkylene is present; and R=n-butyl and X=4,4'-(4'',4'''diphenoxy)phenylene.

In embodiments, the imaging members of the present invention are comprised of, in the order indicated, a conductive substrate, a photogenerating layer comprising symmetrical perylene bisimide dimer pigments dispersed in a resinous binder composition, and a charge transport layer, which comprises charge transporting molecules dispersed in an inactive resinous binder composition.

In embodiments, the photoconductive imaging member comprises a conductive substrate, a hole transport layer comprising a hole transport composition, such as an aryl amine, dispersed in an inactive resinous binder composition, and as a top layer a photogenerating layer comprised of symmetrical perylene bisimide dimer pigments optionally dispersed in a resinous binder composition; or a conductive substrate, a hole blocking metal oxide layer, an optional adhesive layer, a photogenerating layer comprised of the symmetrical perylene bisimide dimer pigment of the present invention, optionally dispersed in a resinous binder composition, and an aryl amine hole transport layer comprising aryl amine hole transport molecules optionally dispersed in a resinous binder.

The substrate can be formulated entirely of an electrically conductive material, or it can be comprised of an insulating material having an electrically conductive surface. The substrate can be of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects thereof. In a particularly preferred embodiment, the thickness of this layer is from about 3 mils to about 10 mils. The substrate can be opaque or substantially transparent and can comprise numerous suitable materials having the desired mechanical properties. The entire substrate can comprise the same material as that in the electrically conductive surface, or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, titanium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness of from about 50 Angstroms to many centimeters, although the thickness can be outside of this range. When a flexible electrophotographic imaging member is desired, the thickness typically is from about 100 Angstroms to about 750 Angstroms. The substrate can be of any other conventional material, including organic and inorganic materials. Typical substrate materials include insulating nonconducting materials such as various resins known for this purpose including polycarbonates, polyamides, polyurethanes, paper, glass, plastic, polyesters such as MYLAR® (available from E. I. DuPont) or MELINEX 447® (available from ICI Americas, Inc.), and the like. If desired, a conductive substrate can be coated onto an insulating material. In addition, the substrate can comprise a metallized plastic, such as titanized or aluminized MYLAR®, wherein the metallized surface is in contact with the photogenerating layer or any other layer situated between the substrate and the photogenerating layer. The coated or uncoated substrate can be flexible or rigid, and can have any number of configurations, such as a plate, a cylindoical drum, a scroll, an endless flexible belt, or the like. The outer surface of the substrate preferably comprises a metal oxide such as aluminum oxide, nickel oxide, titanium oxide, and the like.

In embodiments, intermediate adhesive layers between the substrate and subsequently applied layers may be desirable to improve adhesion. When such adhesive layers are utilized, they preferably have a dry thickness of from about 0.1 micron to about 5 microns, although the thickness can be outside of this range. Typical adhesive layers include film-forming polymers such as polyester, polyvinylbutyral, polyvinylpyrrolidone, polycarbonate, polyurethane, polymethylmethacrylate, and the like as well as mixtures thereof. Since the surface of the substrate can be a metal oxide layer or an adhesive layer, the expression substrate is intended to also include a metal oxide layer with or without an adhesive layer on a metal oxide layer.

The photogenerating layer is of an effective thickness, for example, of from about 0.05 micron to about 10 microns or more, and in embodiments has a thickness of from about 0.1 micron to about 3 microns. The thickness of this layer can be dependent primarily upon the concentration of photogenerating material in the layer, which may generally vary from about 5 to 100 percent. The 100 percent value generally occurs when the photogenerating layer is prepared by vacuum evaporation of the pigment. When the photogenerating material is present in a binder material, the binder contains, for example, from about 25 to about 95 percent by weight of the photogenerating material, and preferably contains about 60 to 80 percent by weight of the photogenerating material. Generally, it is desirable to provide this layer in a thickness sufficient to absorb about 90 to about 95 percent or more of the incident radiation which is directed upon it in the imagewise or printing exposure step. The maximum thickness of this layer is dependent primarily upon factors such as mechanical considerations, such as the specific photogenerating compound selected, the thicknesses of the other layers, and whether a flexible photoconductive imaging member is desired.

Typical transport layers are described, for example, in U.S. Pat. Nos. 4,265,990; 4,609,605; 4,297,424 and 4,921,773, the disclosures of each of these patents being totally incorporated herein by reference. Organic charge transport materials can also be employed. Typical charge, especially hole, transporting materials include the following.

Hole transport molecules of the type described in U.S. Pat. Nos. 4,306,008; 4,304,829; 4,233,384; 4,115,116; 4,299,897; 4,081,274, and 5,139,910, the disclosures of each are totally incorporated herein by reference, can be selected for the imaging members of the present invention. Typical diamine hole transport molecules include N,N'-diphenyl-N, N'-bis(3-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-(1,1'-biphenyl)-4,4'-diamine, N,N'-diphenyl-N,N'-bis(4-chlorophenyl)-(1,1'-biphenyl)-4,4'-diamine, N,N'-diphenyl-N,N'-bis(phenylmethyl)-(1,1'-biphenyl)-4,4'-diamine, N,N,N',N'-tetraphenyl-[2,2'-dimethyl-1,1'-biphenyl]-4,4'-diamine, N,N,N',N'-tetra-(4-methylphenyl)-[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(3-methylphenyl)-[2,2'-dimethyl-1,1'-biphenyl]-4,4'-diamine, N,N'-diphenyl-N,N'-bis(3-methylphenyl)-pyrenyl-1,6-diamine, and the like.

In embodiments of the present invention, a preferred hole transport layer, since it enables excellent effective transport of charges, is comprised of aryldiamine components as represented, or essentially represented, by the following general formula

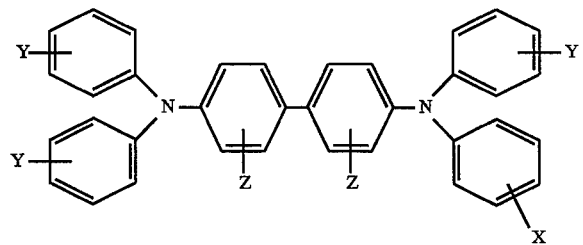

wherein X, Y and Z are selected from the group consisting of hydrogen, an alkyl group with, for example, from 1 to about 25 carbon atoms and a halogen, preferably chlorine, and at least one of X, Y and Z is independently an alkyl group or chlorine. When Y and Z are hydrogen, the compound may be N,N'-diphenyl-N,N'-bis(alkylphenyl)-(1,1'-biphenyl)-4,4'-diamine wherein alkyl is, for example, methyl, ethyl, propyl, n-butyl, or the like, or the compound may be N,N'-diphenyl-N,N'-bis(chlorophenyl)-(1,1'-biphenyl)-4,4'-diamine.

The charge transport material is present in the charge transport layer in an effective amount, generally from about 5 to about 90 percent by weight, preferably from about 20 to about 75 percent by weight, and more preferably from about 30 to about 60 percent by weight, although the amount can be outside of this range.

Examples of the highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes, polystyrenes, and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 5 to about 90 percent by weight of the active material corresponding to the foregoing formula, and preferably from about 20 percent to about 75 percent of this material.

Similar binder materials may be selected for the photogenerating layer, including polyesters, polyvinyl butyrals, polyvinylcarbazole, polycarbonates, polyvinyl formals, poly (vinylacetals) and those illustrated in U.S. Pat. No. 3,121,006, the disclosure of which is totally incorporated herein by reference.

The photoconductive imaging member may optionally contain a charge blocking layer situated between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, preferably being no more than about 2 microns.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

The symmetrical dimers of the present invention can be readily prepared by reaction, or condensation of about 2 to about 5 equivalents of a perylene monoimide-monoahydride with one equivalent of a symmetrical alkylene, symmetrical cycloalkylene, symmetrical aralkylene, or symmetrical arylene diamine such as ethylene diamine, propylene diamine, 1,3-diamino-2-hydroxypropane, 1,4-diaminobutane, meta-xylylene diamine and the like, in an organic solvent, such as chloronaphthalene, trichlorobenzene, decalin, tetralin, aniline, dimethylformamide, dimethylsulfoxide, N-methylypyrrolidone and the like with the optional use of catalysts such as zinc acetate or zinc iodide in an amount equivalent to about 1 to 50 mole percent of the perylene. The concentration of reactants in the solvent can range from about 50 weight percent diamine and anhydride and 50 percent solvent to about 5 percent diaminine and anhydride and 95 percent solvent with a preferred range being from about 5 percent diamine and anhydride and 95 percent solvent to 20 percent diamine and anhydride and 80 percent solvent. The reactants are stirred in the solvent and heated to a temperature of from about 100° C. to about 300° C., preferably from 150° C. to 205° C. for a period of from 10 minutes to about 8 hours depending on the rate of the reaction. The mixture is subsequently cooled to a temperature of between about 50° C. to about 175° C., and the solid pigment is separated from the mother liquors by filtration through, for example, a fine porosity sintered glass filter funnel or a glass fiber filter. The pigment product is then subjected to a number of washing steps using hot and cold solvents such as dimethyl formamide, methanol, water and alcohols. Optionally, the pigment may be washed with dilute hot or cold aqueous base solution, such as 5 percent of sodium hydroxide or potassium carbonate, which serves to remove by dissolution any residual starting anhydride and other acidic contaminants. Optionally, the symmetrical dimeric perylene pigment product may also be washed with dilute acid, such as 2 percent aqueous hydrochloric acid, which serves to remove residual metal salts such as, for example, zinc acetate which can be optionally used as a reaction catalyst. Finally, the pigment is dried either at ambient temperature or at temperatures up to 200° C. at atmospheric pressure or under vacuum. The yield of product, referred to as as-synthesized pigment, ranges from about 50 percent to nearly 100 percent.

More specifically, the process of the present invention comprises stirring a mixture of 2.25 molar equivalents of a perylene tetracarboxylic acid mono imide-mono anhydride having the structure of Formula 2 with R=n-propyl, n-phenyl and the like in N-methylpyrrolidinone solvent in an amount corresponding to about 50 parts by weight of solvent to about 2 parts of monoanhydride at room temperature. Adding 1 molar equivalent of a symmetric diamine, such as 1,3-diaminopropane ar 1,4-diamino benzene and, optionally, a catalyst known to speed up the reaction of amine with anhydrides such as zinc acetate dihydrate in an amount corresponding to about 0.5 equivalents, to this mixture. Stirring this mixture and heating it until the solvent begins to reflux (N-methylpyrrolidinone boils at 202° C.) during which treatment the diamine reacts sequentially with two molecule of the monoanhydride to form the dimeric pigment molecule. Maintaining the heating and stirring at the solvent reflux temperature for a period of about 2 hours to ensure completion of the reaction, then cooling the reaction mixture to about 150° C. and filtering the mixture through a filter such as fine-porosity sintered glass of a glass-fiber filter which has been preheated to about 150° C. with, for example, boiling solvent such as dimethyl formamide (DMF). Washing the pigment in the filter with DMF heated to about 150° C. (which serves to dissolve and thus remove any residual starting anhydride) until the color of the filtrate wash becomes, and remains, colorless or light orange. The pigment is washed with DMF at room temperature and is finally washed with acetone, methanol or a similar low-boiling solvent and is dried at 60° C. in an oven.

Optionally, water can be used in the final washing step and the pigment wet cake can be freeze dried. This process generally provides free-flowing pigment which is more readily redispersed in solvent than solvent washed pigment which has been dried using other methods which can sometimes result in the formation of a hard caked mass of pigment which is difficult to redisperse.

Also optionally, in situations where the hot, for example 60° to 150° C., solvent (e.g. DMF) fails to completely remove all the excess starting monoanhydride from the dimer the product can be dispersed in dilute (for example 1 to 5 percent) aqueous potassium hydroxide for a period of time of from about 1 hour to about 24 hours, and preferably from about 7 to about 20 hours, at room temperature, about 25° C., to about 90° C., which treatment converts the monoimide to a water-soluble, deep purple-colored dipotassium carboxylate salt, followed by filtration, and washing the solid with water until the filtrate becomes colorless. Residual starting anhydride in the product can be detected by known spectroscopic methods such as FT-IR and NMR or by a color spot test in which the product is stirred in dilute (ca. 2 percent) aqueous potassium hydroxide solution (the presence of monoanhydride is indicated by the development of a deep purple color characteristic of the dipotassium salt of the monoimide).

Also, optionally in situations where a metal-containing catalyst such as zinc acetate dihydrate has been used to improve the reaction rate the product can be stirred in dilute acid such as 2 percent aqueous hydrochloric acid which process coverts the residual metal to water soluble salts which can then be removed by filtration and washing with water.

The symmetrical photogenerating compounds of the present invention in embodiments thereof enable enhanced photosensitivity in the visible wavelength range. In particular, imaging members with photosensitivity at wavelengths of from about 400 to 700 nanometers are provided in embodiments of the present invention, which renders them particularly useful for color copying and imaging and printing applications, such as red LED and diode laser printing processes, which typically require sensitivity of about 600 to about 700 nanometers.

The present invention also encompasses a method of generating images with the photoconductive imaging members disclosed herein. The method comprises the steps of generating an electrostatic latent image on a photoconductive imaging member of the present invention, developing the latent image with a known toner comprised of resin, pigment like carbon black, and a charge additive, and transferring the developed electrostatic image to a substrate. Optionally, the transferred image can be permanently affixed to the substrate. Development of the image may be achieved by a number of methods, such as cascade, touchdown, powder cloud, magnetic brush, and the like Transfer of the developed image to a substrate may be by any method, including those making use of a corotron or a biased roll. The fixing step may be performed by means of any suitable method, such as flash fusing, heat fusing, pressure fusing, vapor fusing, and the like. Any material used in xerographic copiers and printers may be used as a substrate, such as paper, transparency material, or the like.

For the process of the present invention, it is preferably in embodiments to select catalysts, such as zinc acetate, in effective amounts, such as for example from about 1 to about 20, or from 1 to about 3 parts or weight percent based on the weight percent of the reactants.

Specific embodiments of the invention will now be described in detail. These Examples are intended to be illustrative, and the invention is not limited to the materials, conditions, or process parameters set forth in these embodiments. All parts and percentages are by weight unless otherwise indicated.

SYNTHESIS EXAMPLES

The starting monoanhydride monoimides in the following examples were prepared by the methods described in U.S. Pat. No. 4,501,906, the disclosure of which is totally incorporated herein by reference, or by minor adaptations of the process described therein. The structures of the product dimers described below were mainly established by $^1$H and $^{13}$C nuclear magnetic resonance spectrometry in trifluoroacetic acid-containing solvent mixtures. Visible absorption spectra in trifluoroacetic acid-methylene chloride solution were also measured for each product. The bisimide dimers evidence absorbance maxima at about 500 and 540 nanometers which is diagnostic for the perylene bisimide chromophore in this solvent system. Trivial names, based on the substituent groups and referring to the perylene bisimide moiety as the imidoperyleneimido group, have been used. To avoid or minimize confusion and ambiguity, all compounds are also described in relation to the structures or formulas of Formula 1.

The synthesis Examples that follow are representative of the general synthesis and purification processes selected.

SYNTHESIS EXAMPLE 1

Preparation of 1,3-Bis(propylimidoperyleneimido)propane (Formula 1, R=n-Propyl, X=1,3-propylene):

A suspension of propylimidoperylene anhydride (Formula 2, R=n-propyl, 2.38 grams, 0.0055 mole) in 100 milliliters of N-methylpyrrolidone (NMP) was mixed with 0.185 gram (0.0025 mole) of 1,3-diaminopropane. The resulting mixture was stirred and heated to reflux at about 202° C. After 2½ hours at reflux, the resultant black suspension was cooled to 150° C. by the addition of 50 milliliters of dimethylformamide (DMF). The resulting mixture was filtered through a 9 centimeters Whatman Grade GF/F glass fiber filter in a porcelain funnel which had been preheated with boiling DMF. The solid resulting was washed in the funnel until the filtrate was colorless; 4×50 milliliters portions of boiling DMF were required. The solid product was washed with 50 milliliters of cold DMF then with 2×25 milliliter portions of methanol and was air dried at 60° C. to yield 2.3 grams (97 percent) of the dimer as a jet black solid.

A spot test for the presence of starting monoanhydride which was accomplished by stirring a small amount, about 1 to 2 weight percent of pigment in 2 percent of aqueous potassium hydroxide solution was negative, there being no sign of the deep red-purple color characteristic of the monoimide dicarboxylate salt.

SYNTHESIS EXAMPLE 2

Preparation of Bis(propylimidoperyleneimido)-meta-xylylene (Formula 1, R=n-Propyl, X=1,3-xylylene):

A mixture of propylimidoperylene anhydride (Formula 3a, R=n-propyl, 2.38 grams, 0.0055 mole) and meta-xylylenediamine (0.340 gram, 0.0025 mole) in 75 milliliters of NMP was stirred and heated to reflux. The reddish orange suspension was stirred at reflux for 2⅓ hours, then was cooled to 155° C. by adding 40 milliliters of DMF. The resulting solid was filtered and washed with boiling DMF as in Example 1, the final boiling DMF filtrate being a light orange color. Washing with 50 milliliters of cold DMF and with 2×25 milliliters of methanol and drying at 60° C. in air provided 2.1 grams (87 percent) of a burgundy red solid product. A spot test for the presence of starting monoanhydride was negative.

SYNTHESIS EXAMPLE 3

Preparation of 4,4'-bis(n-propylimidoperyleneimido) biphenyl (Formula 1, R=n-propyl, X=4,4'-biphenylene):

A mixture of 2 38 grams (0.0055 mole) of n-propylimidoperylene anhydride (FIG. 2, R=n-propyl), 4,4'-diaminobiphenyl (0.460 gram, 0.0025 mole) and zinc acetate dihydrate (0.270 gram, 0.00125 mole) in 75 milliliters of NMP was stirred and heated to reflux. After 2 hours and 20 minutes at reflux, 50 milliliters of DMF were added to the mixture to cool it to 150° C. The mixture was filtered through a 9 centimeters diameter glass fiber filter (Grade GF/F) which had been preheated to about 150° C. with boiling DMF and the solid was washed with 4×50 milliliters portions of boiling DMF then with 50 milliliters of cold DMF and 2×20 milliliter portions of methanol.

When a sample of the solid was stirred in a 2 percent aqueous solution of potassium hydroxide a reddish purple color developed which was indicative of residual starting anhydride in the product. The product was stirred in 100 milliliters of DMF and the suspension was heated to reflux for 5 minutes then was refiltered and washed as above. The product was dried at 60° C. to give 1.7 gram of orange solid which corresponded to a 67 percent yield of dimer.

SYNTHESIS EXAMPLE 4

Preparation of 1,4-Bis(pentylimidoperyleneimido)benzene (Formula 1, R=n-pentyl, X=1,4-phenylene):

A mixture of n-pentylimidoperylene anhydride (Formula 3a, R=n-pentyl, 2.61 grams, 0.0055 mole), 1,4-diaminobenzene (0.270 gram, 0.0025 mole) and zinc acetate dihydrate (0.27 gram, 0.00125 mole) was stirred and heated in 75 milliliters of NMP. The resultant brown suspension was heated at reflux for 3¾ hours, then was cooled to 150° C. by adding 50 milliliters of DMF. The resulting solid was filtered through a preheated 9 centimeter GF/F filter and was washed with boiling DMF (5×50 milliliter portions) until the filtrate remained at a light, or faint orange color. The solid product was then washed with cold DMF, then with methanol as in Example 2 and was dried at 60° C. to yield 2.1 grams (85 percent) of dimer product as a red solid.

A spot test for the starting anhydride reactant was negative.

SYNTHESIS EXAMPLE 5

Preparation of 1,3-bis(phenethylimidoperyleneimido) propane (Formula 1, R=2-phenethyl, X=1,3-propylene):

Phenethylimidoperylene anhydride (Formula 2, R=2-phenethyl; 2.72 grams, 0.0055 mole) and 1,3-diaminopropane (0.185 gram, 0.00250 mole) in 100 milliliters of NMP was stirred at room temperature for 15 minutes. The resulting mixture was then heated to reflux (202° C.) and maintained at this temperature for 2 hours. The resultant black dispersion was cooled to 150° C. by the addition of 50 milliliters of cold DMF, then was filtered through a preheated glass fiber filter. The solid product was wasted on the filter with 5×25 milliliter portions of boiling DMF, then with 25 milliliters of cold DMF, and 2×25 milliliter portions of methanol. The product was dried at 60° C. to yield 2.4 grams (93 percent) of the dimer product as a jet black solid.

SYNTHESIS EXAMPLE 6

Preparation of 1,3-bis-(pentylimidoperyleneimido)propane (Formula 1, R=n-pentyl, X=1,3-propylene):

A well-stirred dispersion of monopentylimidoperylene anhydride (Formula 3a, R=n-pentyl, 12.7 grams, 0.0275 mole) in 750 milliliters of NMP in a 1 liter Erlenmeyer flask was treated with 0.927 gram (1.05 milliliter, 0.0125 mole) of 1,3-diaminopropane. The resulting mixture was then stirred at room temperature, about 25° C., for 15 minutes, then was heated to reflux. The resulting mixture initially became thick and dark brown at about 120° C., but thinned out and turned black in color as the mixture began to reflux at 202° C. The mixture was stirred at reflux for 3¼ hours, then was allowed to cool to 160° C. The mixture was filtered through a preheated 15 centimeter Whatman Glass Fiber Filter (Grade GF/F) in a porcelain funnel which had been preheated with about 300 milliliters of boiling DMF. The resulting solid product was washed in the funnel with 3×150 milliliter portions of boiling DMF. The initial filtrate was dark brown; the filtrate from the final boiling DMF wash was colorless. The solid resulting was then washed with 50 milliliters of DMF, then with 3×25 milliliter portions of water. The solid was then dried at 60° C. to provide 11.1 grams of dimer as a black solid. (Yield=93 percent). A spot test using dilute potassium hydroxide solution showed no evidence of the starting anhydride.

SYNTHESIS EXAMPLE 7

Preparation of Bis-(propylimidoperyleneimide) (Formula 1, R=n-propyl, X=N—N bond):

A mixture of 2.39 grams (0.0055 mole) of monopropylimidoperylene anhydride (Formula 3a, R=n-propyl) and anhydrous hydrazine (0.0080 gram, 78 microliters, 0.0025 mole) in 100 milliliters of NMP was stirred and heated to reflux. After 1½ hour at reflux (202° C.), the resulting mixture was cooled to 150° C. and was filtered through a 7 centimeter diameter Whatman Grade 934AH glass fiber filter which had been preheated with 50 milliliters of boiling DMF. The resulting solid was washed on the funnel with 3×20 milliliter portions of boiling DMF. The final filtrate was light orange in color. The solid was washed with cold DMF, then methanol and was dried at 60° C.

A small sample (about 20 milligrams) of the above obtained product dispersed in 2 millimeters of 2 percent potassium hydroxide solution developed a reddish purple color after about 1 hour indicating the presence of residual starting monoanhydride in the product. The entire product was stirred in 100 milliliters of 2 percent potassium hydroxide at 90° to 100° C. for 1 hour, and the resultant purple suspension was cooled and was filtered. The solid was washed with water until the filtrate became colorless, then with 20 milliliters of methanol. The product was dried at 60° C. to provide 1,2 grams (56 percent yield) of the pure dimer.

SYNTHESIS EXAMPLE 8

Preparation of 9,9-bis(4-pentylimidoperyleneimidophenyl) fluorene, (Formula 1, R=n-pentyl, X=9,9-bis-(4-phenyl) fluorene):

A mixture of pentylimidoperylene anhydride (5.07 grams, 0.011 mole), 9,9-bis(4-aminophenyl)fluorene (1.74 grams, 0.0050 mole) and the catalyst zinc acetate dihydrate (1.1 gram, 0.0050 mole) in 200 milliliters of NMP was stirred and heated to reflux under an atmosphere of Argon gas. The resulting mixture was stirred at reflux (202° C.) for 3¼ hours, then was cooled to 150° C. and was filtered through a preheated (boiling DMF) 11 centimeter Whatman GF/F glass fiber filter. The resulting solid was washed in the funnel with 3×200 milliliter portions of boiling DMF. The initial filtrate was dark brown, the final wash filtrate was colorless. A spot test with dilute aqueous potassium hydroxide on the wet cake was negative for the starting anhydride reactant. To remove residual zinc salts formed from the catalyst, the product was stirred vigorously in 300 milliliters of 2 percent aqueous hydrochloric acid for 1 hour at 60° C., then was refiltered. The solid product was then washed with water until the filtrate pH was 6, followed by drying at 60° C. to provide 4.7 grams (76 percent yield) of the desired dimer as a bright orange solid.

SYNTHESIS EXAMPLE 9

Preparation of 1,4-bis(4-n-butylimidoperyleneimidophenoxy)benzene, (Formula 1, R=n-butyl, X=1,4-bis(phenoxy)benzene:

A mixture of n-butylimidoperylene anhydride (Structure 2, R=n-butyl; 4.92 grams, 0.011 mole), 1,4-bis(4-aminophenoxy)benzene (1.46 gram, 0.005 mole) and zinc acetate dihydrate (0.22 gram, 0.001 mole) in 200 milliliters of NMP was stirred and heated to reflux. The mixture was heated at the reflux temperature (202° C.) for 2 hours, then was cooled to 150° C. and was filtered through a preheated glass fiber filter. The solid was washed with 4×100 milliliter portions of boiling DMF then with 100 milliliters of cold DMF and 2×50 milliliters of methanol. The product was dried in the air to provide 5.0 grams (80 percent yield) of the dimer as a reddish brown solid.

COMPARATIVE SYNTHESIS EXAMPLE 1

Preparation of Bis(n-propylimido)perylene (Formula 3a, R=n-propyl):

A mixture of 3,4,9,10-perylene tetracarboxylic acid dianhydride (7.84 grams, 0.02 mole) and n-propylamine (8.2 milliliters, 5.91 grams, 0.10 mole) in 300 milliliters of NMP was stirred and heated to reflux at 202° C. The resultant black suspension was heated at reflux for ½ hour, then was cooled to 150° C. The resulting mixture was filtered through a preheated glass fiber filter and the solid was washed with boiling DMF (3×50 milliliters) until the filtrate was a light orange color. The solid product was washed with 50 milliliters of cold DMF and 2×25 milliliters of methanol, then was dried at 60° C. to yield 8.2 grams (87 percent) of the bisimide as shiny black crystals.

COMPARATIVE SYNTHESIS EXAMPLE 2

Preparation of Bis(n-pentylimido)perylene (Formula 3a, R=n-pentyl):

A mixture of 3,4,9,10-perylene tetracarboxylic acid dianhydride (7.84 grams, 0.02 mole) and amyl amine (8.72 grams, 11.6 milliliters, 0.10 mole) was stirred and heated to reflux at 202° C. After 30 minutes at reflux, the mixture was cooled to 120° C. and was filtered. The solid product was washed with 3×50 milliliter portions of DMF at 100° C., then with 50 milliliters of cold DMF and 2×25 milliliter portions of methanol. Drying at 60° C. provided 8.7 grams (82 percent) of the above bisimide product as shiny dark brown crystals.

EXAMPLE 10

EXAMPLE OF THE USE OF SYMMETRICAL PERYLENE BISIMIDE DIMERS AS DISPERSED COLORANTS FOR PLASTIC

General Dispersion Method:

To primarily demonstrate the application of the dimers of this invention as dispersed colorants, samples of pigments dispersed in poly(vinypoly(vinyl acetate) were prepared as follows: 0.2 gram of the prepared perylene bisimide dimer pigment, 8 milliliters of a 1.5 percent W/W solution of poly(vinyl acetate) ($M_w$=45,000, Polysciences, Inc.) in dichloromethane and 70 grams of ⅛ inch diameter stainless balls were charged into a 30 milliliter glass jar. The jar was sealed and the mixture was milled on a roll mill for 3 to 5 days until the pigment particles were submicron in size and were finely dispersed. Colored films were prepared by coating a clear plastic sheet, such as MYLAR® polyester, with the dispersion using a #8 wire-wound rod. The nominal film wet thickness was about 20 microns, the dried film was about 1 micron. The films comprised of about 60 percent of well-dispersed pigment in PVA had an optical density of about 1 and exhibited a variety of colors.

The large range of colors available by varying the R and X groups of the dimers of this invention are illustrated in Table 1 which provides the color of films prepared for 12 representative compounds.

TABLE 1

Colors of Raw Pigments and PVA-Dispersed Films of Some Perylene Bisimide Dimers

| R | X | Color of Raw Pigment | Color of PVA Dispersion |
|---|---|---|---|
| n-Pentyl | 4,4'-biphenylene | red-orange | orange |
| iso-Butyl | 1,4-phenyl | dull red | red-orange |
| n-Propyl | N—N bond | black | purple |
| Phenethyl | ethylene | black | black |
| Methyl | 1,3-propylene | black | red |
| n-Butyl | 1,3-propylene | black | olive green |
| neo-Pentyl | 1,3-propylene | red-brown | bright red |
| n-Butyl | 2,2-dimethyl-1,3-propylene | yellow-brown | violet |
| n-Propyl | 1,4-tetramethylene | dark brown | burgundy |
| Phenethyl | 1,4-tetramethylene | orange | orange |
| n-Propyl | 1,8-octamethylene | dark brown | maroon |
| n-Pentyl | 1,10-decamethylene | brown | red |

EXAMPLE 11

Xerographic Evaluation of Perylene Bisimide Dimers:

Photoresponsive imaging members were fabricated with the perylene dimer pigments obtained by Synthesis Examples 1,3, 5, 6, 7 and 9, respectively. These photoresponsive imaging members are generally known as dual layer photoreceptors containing a photogenerator layer, and thereover a charge transport layer. The photogenerator layer was prepared from a pigment dispersion as follows: 0.2 gram of the perylene dimer pigment was mixed with 0.05 gram of polyvinyl carbazole (PVK) polymer and 8.1 milliliters of methylene chloride in a 30 milliliter glass bottle containing 70 grams of ⅛-inch stainless steel balls. The bottle was placed on a roller mill, and the dispersion was milled for 4 days. Using a film applicator of 1.5 mil gap, the pigment dispersion was coated to form the photogenerator layer on a titanized MYLAR™ substrate of 75 microns in thickness which had a silane layer, 0.1 micron in thickness, thereover, E. I. DuPont 49,000 polyester adhesive thereon in a thickness of 0.1 micron. Thereafter, the photogenerator layer formed was dried in a forced air oven at 135° C. for 20 minutes. Photogenerator layers for each device were each overcoated with an amine charge transport layer prepared as follows. A transport layer solution was prepared by mixing 8.3 grams of MAKROLON™, a polycarbonate resin, 4.4 grams of N,N'-diphenyl-N,N'-bis(3-methylphenyl)-(1,1'-biphenyl)-4,4'-diamine and 82.3 grams of methylene chloride. The solution was coated onto the above photogenerating layer using a film applicator of 10 mil gap. The resulting member was dried at 135° C. in a forced air oven for 20 minutes and the final dried thickness of transport layer was 20 microns.

The xerographic electrical properties of each imaging member were then determined by electrostatically charging its surface with a corona discharging device until the surface potential, as measured by a capacitively coupled probe attached to an electrometer, attained an initial value $V_o$. After resting for 0.5 second in the dark, the charged member reached a surface potential of $V_{ddp}$, dark development potential, and was then exposed to light from a filtered xenon lamp. A reduction in the surface potential to $V_{bg}$, background potential due to photodischarge effect, was observed. Usually the dark decay in volt/second was calculated as $(V_o-V_{ddp})/0.5$. Usually the lower the dark decay value, the better is the ability of the member to retain its charge prior to exposure by light. Similarly, the lower the $V_{ddp}$, the poorer is the charging behavior of the member. The percent photodischarge was calculated as 100 percent× $(V_{ddp}-V_{bg})/V_{ddp}$. The light energy used to photodischarge the imaging member during the exposure step was measured with a light meter. The photosensitivity of the imaging member can be described in terms of $E_{1/2}$, amount of exposure energy in erg/cm² required to achieve 50 percent photodischarge from the dark development potential. The higher the photosensitivity, the smaller is the $E_{1/2}$ value. High photosensitivity (lower $E_{1/2}$ value), lower dark decay and high charging are desired for the improved performance of xerographic imaging members.

The following Table 2 summarizes the xerographic electrical results when the exposed light used was at a wavelength of 500 nanometers.

TABLE 2

| Imaging Member No. | Perylene | Synthesis Example | Dark Decay V/s | $E_{1/2}$ erg/cm² |
|---|---|---|---|---|
| 1 | 1,3-bis(propylimidoperyleneimido)propane | 1 | 17.3 | 11.0 |
| 2 | 4,4'-bis-(n-propylimidoperyleneimido)biphenyl | 3 | 27.0 | 20.0 |
| 3 | 1,3-bis(phenethylimidoperyleneimido)propane | 5 | 27.0 | 13.0 |
| 4 | 1,3-bis-(pentylimidoperyleneimido)propane | 6 | 34.0 | 4.4 |
| 5 | bis-(propylimidoperyleneimide) | 7 | 9.5 | 25.6 |
| 6 | 1,4-bis-(4,4'-n-butylimido peryleneimidophenoxy)benzene | 9 | 19.0 | −7.3 |

All the imaging members with the invention photogenerating pigments exhibited acceptable charge acceptance, and most showed low to moderate dark decay ranging from about 20 to <50 volts per second, and photosensitivities ranging from excellent ($E_{1/2}$ of about 4.4 ergs/cm²) to moderate ($E_{1/2}$ of about 26 ergs/cm²) indicating that these perylene dimers are highly useful for xerographic imaging applications. The trend of photosensitivity is not obvious from the chemical structures of the perylene pigments.

EXAMPLE 12

Comparison of Perylene Bisimide Dimer with Monomeric Perylene Pigments:

The xerographic properties of an imaging member incorporating perylene dimer, 1,3-bis-(pentylimidoperyleneimido)propane, from Synthesis Example 6 were compared with those of monomeric perylene pigments, bis(n-propylimido)perylene, and bis(n-pentylimido)perylene obtained from Comparative Synthesis Examples 1 and 2. In accordance with Example 11, an imaging member was fabricated for each photogenerating pigment and xerographic electrical properties of the imaging member were tested. The results obtained are summarized in Table 3

TABLE 3

| Imaging Member No. | Perylene | Synthesis | Dark Decay V/s | $E_{1/2}$ erg/cm² |
|---|---|---|---|---|
| 1 | 1,3-bis-(pentylimidoperyleneimido)propane | Synthesis Example 6 | 34 | 4.4 |
| 2 | bis-(n-propylimido)perylene | Comparative Example 1 | 10 | 13 |
| 3 | bis-(n-pentylimido)perylene | Comparative Example 2 | 10 | 7 |

To achieve the same amount of photodischarge, for example about 50 percent, the perylene dimer, 1,3-bis-(pentylimidoperyleneimido)propane, needs an exposure energy of about 4 erg/cm² whereas the other monomer perylene pigments require 7 to 13 erg/cm². Thus, the invention dimer pigment is about 2 to 3 times more photosensitive than the monomeric pigments.

Other embodiments and modifications of the present invention may occur to those skilled in the art subsequent to a review of the information presented herein; these embodiments and modifications, as well as equivalents thereof, are also included within the scope of this invention.

What is claimed is:

1. Photoconductive imaging members comprised of a symmetrical dimeric perylene as a charge generator, wherein said perylene is of the following formula

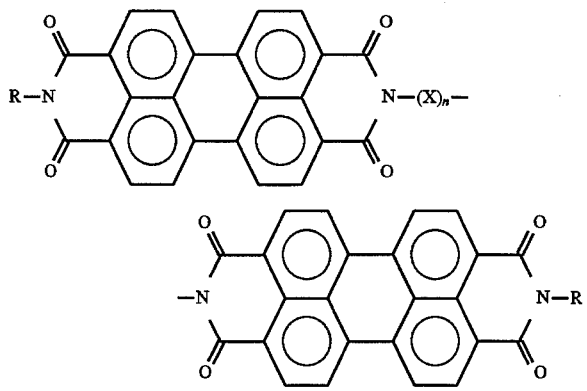

wherein R is hydrogen, alkyl, cycloalkyl, oxaalkyl, substituted alkyl, aryl, substituted aryl, aralkyl or substituted aralkyl, and X is the symmetrical bridging moiety, N—N when n is zero, alkylene, substituted alkylene, cycloalkylene, arylene, substituted arylene, aralkylene, or substituted aralkylene.

2. A photoconductive imaging member comprised of a supporting substrate, a photogenerator layer comprised of a symmetrical perylene bisimide photogenerator pigment of the following formula

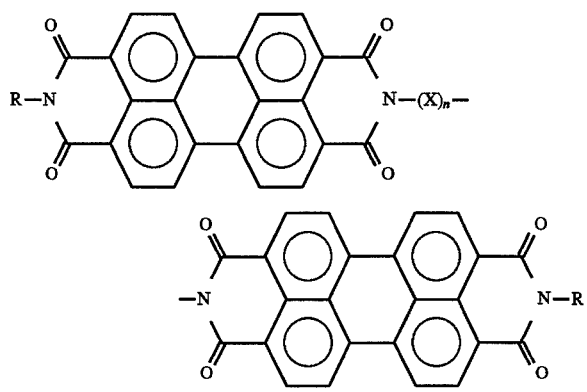

wherein R is hydrogen, alkyl, cycloalkyl, oxaalkyl, substituted alkyl, aryl, substituted aryl, aralkyl or substituted aralkyl, and X is a symmetrical bridging moiety, N—N bond when n is zero, alkylene, substituted alkylene, cycloalkylene, arylene, substituted arylene, aralkylene, or substituted aralkylene, and a charge transport layer.

3. An imaging member in accordance with claim 2 wherein R is hydrogen.

4. An imaging member in accordance with claim 2 wherein alkyl contains from 1 to about 25 carbon atoms, aryl contains from 6 to about 24 carbon atoms, and aralkyl contains from 7 to about 30 carbon atoms.

5. An imaging member in accordance with claim 2 wherein alkyl is methyl, ethyl, propyl, isopropyl, butyl, isobutyl, sec-butyl, 2-methylbutyl, 3-methylbutyl, n-pentyl, 2-pentyl, 3-pentyl, neopentyl, n-hexyl, n-heptyl, n-octyl, n nonyl or n-decyl.

6. An imaging member in accordance with claim 2 wherein cycloalkyl is cyclopropyl, cyclobutyl, cyclohexyl, cycloheptyl, cyclooctyl or cyclododecyl.

7. An imaging member in accordance with claim 2 wherein oxaalkyl is 2-methoxyethyl, 3-methoxypropyl, 3-ethoxypropyl, or 4-methoxybutyl.

8. An imaging member in accordance with claim 2 wherein substituted alkyl is 2-hydroxyethyl, 3-hydroxypropyl, 4-hydroxybutyl, 5-hydroxypentyl, 6-hydroxyhexyl, carboxymethyl, 2-carboxyethyl, 3-carboxypropyl, 4-carboxybutyl, 5-carboxypentyl, or 6-carboxyhexyl.

9. An imaging member in accordance with claim 2 wherein aryl is phenyl, 2-, 3-, or 4-phenylphenyl or 2-naphthyl.

10. An imaging member in accordance with claim 2 wherein substituted aryl is 2-, 3-, or 4-hydroxyphenyl, 2-, 3-, or 4-methylphenyl, 2-, 3-, or 4-tertiary-butylphenyl, 2-, 3-, or 4-methoxyphenyl, 2-, 3-, or 4-halophenyl wherein halo is fluorine, chlorine bromine or iodine, 2-, 3-, or 4-nitrophenyl, or 2-, 3-, or 4-dimethylaminophenyl.

11. An imaging member in accordance with claim 2 wherein aralkyl is benzyl, phenethyl or 3-phenylpropyl.

12. An imaging member in accordance with claim 2 wherein substituted aralkyl is 2-, 3-, or 4-hydroxybenzyl, 2-, 3-, or 4-methylbenzyl, 2-, 3- or 4-tertiary-butylbenzyl, 2-, 3-, or 4-methoxybenzyl, 2-, 3-, or 4-halobenzyl, 2-, 3-, or 4-nitrobenzyl, 2-, 3-, or 4-dimethylaminobenzyl, 2-, 3-, or 4-hydroxyphenethyl, 2-, 3-, or 4-methylphenethyl, 2-, 3-, or 4-tertiary-butylphenethyl, 2-, 3-, or 4-methoxyphenethyl, 2-, 3-, or 4-halophenethyl, 2-, 3-, or 4-nitrophenethyl, or 2-, 3-, or 4-dimethylaminophenethyl, and wherein halo is chloro, fluoro, iodo, or bromo.

13. An imaging member in accordance with claim 2 wherein X is nitrogen-nitrogen with a single bond, and n is zero.

14. An imaging member in accordance with claim 2 wherein alkylene contains from 2 to about 20 carbon atoms, and arylene contains from 6 to about 24 carbon atoms.

15. An imaging member according to claim 2 wherein alkylene is ethylene, 1,3-propylene, 1,4-tetramethylene, 1,5-pentamethylene, 1,6-hexamethylene, 1,7-heptamethylene, 1,8-octamethylene, 1,9-nonomethylene, 1,10-decamethylene, 1,12-dodecamethylene, 1,15-pentadecamethylene, or 1,20-eicosamethylene.

16. An imaging member in accordance with claim 2 wherein substituted alkylene is 2-methoxy-1,3-propylene, 2-hydroxy-1,3-propylene, 2-methyl-1,3-propylene or 2,2-dimethyl-1,3-propylene.

17. An imaging member in accordance with claim 2 wherein cycloalkylene is cis-1,3-cyclobutane, trans-1,3-cyclobutane, cis-1,3-cyclopentane, trans-1,3-cyclopentane, cis-1,4-cyclohexane, trans-1,4-cyclohexane, cis-1,3-cyclohexane, or trans-1,3-cyclohexane.

18. An imaging member in accordance with claim 2 wherein arylene is 1,3-phenylene, 1,4-phenylene, 4,4'-biphenylene, 3,3'-biphenylene, 1,4-naphthylene, 1,5-naphthylene, 2,6-naphthylene, or 2,7-naphthylene.

19. An imaging member in accordance with claim 2 wherein substituted arylene is 2,5-dimethyl-1,4-phenylene, 2,3-dimethy-1,4-phenylene, 2,5-di-tertiary-butyl-1,4-phenylene, 2,5-dimethoxy-1,4-phenylene, 2,3-dimethoxy-1, 4-phenylene, 2,5-dihydroxy-1,4-phenylene, 2,3-dihydroxy-1,4-phenylene, 2,3-dinitro-1,4-phenylene, 2,5-dinitro-1,4-phenylene, 2,3-bis(dimethylamino)-1,4-phenylene, 2,5-bis (dimethylamino)-1,4-phenylene, 2-methyl-1,3-phenylene, 5-methyl-1,3-phenylene, 5-tertiary-butyl-1,3-phenylene, 2-methoxy-1,3-phenylene, 5-methoxy-1,3-phenylene, 2-nitro-1,3-phenylene, 5-nitro-1,3-phenylene, 2-dimethylamino-1,3-phenylene or 5-dimethylamino-1,3-phenylene.

20. An imaging member in accordance with claim 2 wherein aralkylene is 1,2-xylylene, 1,3-xylylene or 1,4-xylylene, wherein the perylene nucleii are bonded to the xylene by a methyl groups, 4,4'-diphenylmethylene, or 4,4'-diphenylisopropylidene.

21. An imaging member in accordance with claim 2 wherein substituted aralkyl is 4,4'-diphenyl-1,1,1,3,3,3-hexafluoroisopropylidene.

22. An imaging member in accordance with claim 2 wherein R is hydrogen, alkyl, cycloalkyl, substituted alkyl, aryl, substituted aryl, aralkyl or a substituted aralkyl group, and X is 1,3-propylene, 2-hydroxy-1,3-propylene, 2-methoxy-1,3-propylene, 2-methyl-1,3-propylene or 2,2-dimethyl-1,3-propylene.

23. An imaging member in accordance with claim 2 wherein R is methyl, ethyl, n-propyl, n-butyl, n-pentyl, n-hexyl, n-heptyl, or n-octyl, and X is a single nitrogen-nitrogen bond, ethylene, 1,4-tetramethylene, 1,5-pentamethylene, 1,6-hexamethylene, 1,7-heptamethylene, 1,8-octamethylene, 1,9-nonamethylene, 1,10-decamethylene, 1,11-undecamethylene or 1,12-dodecamethylene.

24. An imaging member in accordance with claim 2 wherein R is methyl, ethyl, n-propyl, n-butyl, n-pentyl, n.hexyl, n-heptyl, or n-octyl, and X is 1,3-propylene, 2-hydroxy-1,3-propylene, 2-methoxy-1,3-propylene, 2-methyl-1,3-propylene or 2,2-dimethyl-1,3-propylene.

25. An imaging member in accordance with claim 2 wherein R is isopropyl, isobutyl, sec-butyl, 2-methylbutyl, 3-methylbutyl, 2-(3-methyl)butyl, 2-pentyl, 3-pentyl, neo-pentyl or cyclopentyl, and X is 1,3-propylene, 2-hydroxy-1,3-propylene, 2-methoxy-1,3-propylene, 2-methyl-1,3-propylene or 2,2-dimethyl-1,3-propylene.

26. An imaging member in accordance with claim 2 wherein R is 2-hydroxyethyl, 3-hydroxypropyl, 4-hydroxybutyl, 5-hydroxypentyl, 6-hydroxyhexyl, 2-methoxyethyl, 3-methoxypropyl, or 4-methoxybutyl, and X is 1,3-propylene, 2-hydroxy-1,3-propylene, 2-methoxy-1, 3-propylene, 2-methyl-1,3-propylene or 2,2-dimethyl-1,3-propylene.

27. An imaging member in accordance with claim 2 wherein the supporting substrate is comprised of a metal, a conductive polymer composition, or an insulating polymer with a thickness of from about 30 microns to 300 microns optionally overcoated with an electrically conductive layer with a thickness of from about 0.01 micron to 1 micron.

28. An imaging member in accordance with claim 2 wherein the supporting substrate is comprised of aluminum, and there is further included an overcoating top layer on said member comprised of a polymer.

29. An imaging member in accordance with claim 2 wherein the dimer photogenerator pigment is dispersed in a resinous binder in an amount of from about 5 percent to about 95 percent by weight.

30. An imaging member in accordance with claim 29 wherein the resinous binder is a polyester, a polyvinylcarbazole, a polyvinylbutyral, a polycarbonate, a polyethercarbonate, an aryl amine polymer, a styrene copolymer, or a phenoxy resin.

31. An imaging member in accordance with claim 2 wherein the charge transport layer is comprised of aryl amine molecules or aryl amine polymers.

32. An imaging member in accordance with claim 2 wherein the charge transport layer is comprised of aryl amine molecules of the formula

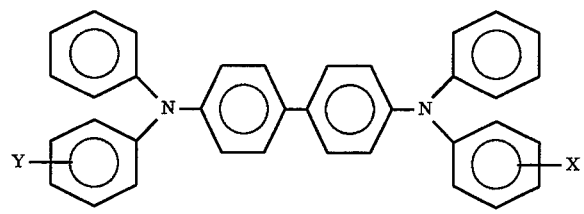

dispersed in a highly insulating polymer wherein X is alkyl or halogen.

33. An imaging member in accordance with claim 32 wherein the highly insulating polymer is a polycarbonate, a polyester, or a vinyl polymer.

34. An imaging member in accordance with claim 2 wherein the photogenerating layer is of a thickness of from about 1 to about 10 microns.

35. An imaging member in accordance with claim 2 wherein the charge transport layer is of a thickness of from about 10 to about 100 microns.

36. An imaging member in accordance with claim 2 wherein the supporting substrate is overcoated with a polymeric adhesive layer of a polyester of a thickness of from about 0.01 to about 1 micron.

37. A photoconductive imaging member in accordance with claim 2 wherein the charge transport layer is situated between the supporting substrate and the photogenerator layer, or the photogenerating layer is situated between the supporting substrate and the charge transport layer.

38. An imaging method which comprises the formation of a latent image on the photoconductive imaging member of claim 1, developing the image with a toner composition comprised of resin and pigment, transferring the image to a substrate, and fixing the image thereto.

39. An imaging method which comprises the formation of a latent image on the photoconductive imaging member of claim 2, developing the image with a toner composition comprised of resin and pigment, transferring the image to a substrate, and fixing the image thereto.

40. Symmetrical perylenes of the following formula

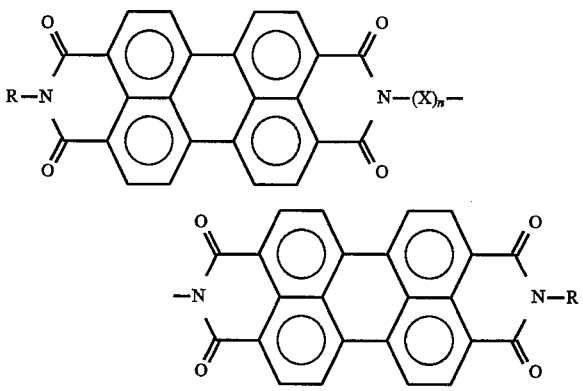

wherein R is hydrogen, alkyl, cycloalkyl, oxaalkyl, substituted alkyl, aryl, substituted aryl, aralkyl or substituted aralkyl, and X is the symmetrical bridging moiety, N—N bond when n is zero, alkylene, substituted alkylene, cycloalkylene, arylene, substituted arylene, aralkylene, or substituted aralkylene.

41. A perylene in accordance with claim 40 wherein alkyl contains from 1 to about 25 carbon atoms, aryl contains from 6 to about 24 carbon atoms, and aralkyl contains from 7 to about 30 carbon atoms.

42. A perylene in accordance with claim 40 wherein R is hydrogen.

43. A perylene in accordance with claim 40 wherein alkyl is methyl, ethyl, propyl, isopropyl, butyl, isobutyl, sec-butyl, 2-methylbutyl, 3-methylbutyl, n-pentyl, 2-pentyl, 3-pentyl, neopentyl, n-hexyl, n-heptyl n-octyl, n-nonyl or n-decyl.

44. A perylene in accordance with claim 40 wherein cycloalkyl is cyclopropyl, cyclobutyl, cyclohexyl, cycloheptyl, cyclooctyl or cyclododecyl.

45. A perylene in accordance with claim 40 wherein oxyalkyl is 2-methoxyethyl, 3-methoxypropyl, 3-ethoxypropyl or 4-methoxybutyl.

46. A perylene in accordance with claim 40 wherein substituted alkyl is 2-hydroxyethyl, 3-hydroxypropyl, 4-hydroxybutyl, 5-hydroxypentyl, 6-hydroxyhexyl, carboxymethyl, 2-carboxyethyl, 3-carboxypropyl, 4-carboxybutyl, 5-carboxypentyl or 6-carboxyhexyl.

47. A perylene in accordance with claim 40 wherein aryl is phenyl, 2-, 3-, and 4-phenylphenyl or 1-, 2-naphthyl.

48. A perylene in accordance with claim 40 wherein substituted aryl is 2-, 3-, and 4-hydroxyphenyl, 2-, 3-, and 4-methylphenyl, 2-, 3-, and 4-tertiary-butylphenyl, 2-, 3-, and 4-methoxyphenyl, 2-, 3-, and 4-halophenyl, 2-, 3-, and 4-nitrophenyl, or 2-, 3-, and 4-dimethylaminophenyl.

49. A perylene in accordance with claim 40 wherein aralkyl is benzyl, phenethyl or 3-phenylpropyl.

50. A perylene in accordance with claim 40 wherein substituted aralkyl is 2-, 3-, or 4-hydroxybenzyl, 2-, 3-, or 4-methylbenzyl, 2-, 3- or 4-tertiary-butylbenzyl, 2-, 3-, or 4-methoxybenzyl, 2-, 3-, or 4-halobenzyl, wherein halo is fluorine, chlorine, bromine or iodine, 2-, 3-, or 4-nitrobenzyl, 2-, 3-, or 4-dimethylaminobenzyl, 2-, 3-, or 4-hydroxyphenethyl, 2-, 3-, or 4-methylphenethyl, 2-, 3-, or 4-tertiary-butylphenethyl, 2-, 3-, or 4-methoxyphenethyl, 2-, 3-, or 4-halophenyethyl, wherein halo is fluorine, chlorine, bromine or iodine, 2-, 3-, or 4-nitrophenethyl, or 2-, 3-, or 4-dimethylaminophenethyl.

51. A perylene in accordance with claim 40 wherein X is a nitrogen-nitrogen single bond.

52. A perylene in accordance with claim 40 wherein alkylene contains from 2 to about 20 carbon atoms, and arylene contains from 6 to about 24 carbon atoms.

53. A perylene in accordance with claim 40 wherein alkylkene is ethylene, 1,3-propylene, 1,4-tetramethylene, 1,5-pentamethylene, 1,6-hexamethylene, 1,7-heptamethylene, 1,8-octamethylene, 1,9-nonomethylene, 1,10-decamethylene, 1,12-dodecamethylene, 1,15-pentadecamethylene, or 1,20-eicosamethylene.

54. A perylene in accordance with claim 40 wherein substituted alkylene is 2-methoxy-1,3-propylene, 2-hydroxy-1,3-propylene, 2-methyl-1,3-propylene, or 2,2-dimethyl-1,3-propylene.

55. A perylene in accordance with claim 40 wherein cycloalkylene is cis-1,3-cyclobutane, trans-1,3-cyclobutane, cis-1,3-cyclopentane, trans-1,3-cyclopentane, cis-1,4-cyclohexane, trans-4-cyclohexane, cis-1,3-cyclohexane, or trans 1,3-cyclohexane.

56. A perylene in accordance with claim 40 wherein arylene is 1,3-phenylene, 1,4-phenylene, 4,4'-biphenylene, 3,3'-biphenylene, 1,4-naphthylene, 1,5-naphthylene, 2,6-naphthylene, or 2,7-naphthylene.

57. A perylene in accordance with claim 40 wherein substituted arylene is 2,5-dimethyl-1,4-phenylene, 2,3-dimethy-1,4-phenylene, 2,5-di-tertiary-butyl-1,4-phenylene, 2,5-dimethoxy-1,4-phenylene, 2,3-dimethoxy-1,4-phenylene, 2,5-dihydroxy-1,4-phenylene, 2,3-dihydroxy-1,4-phenylene, 2,3-dinitro-1,4-phenylene, 2,5-dinitro-1,4-phenylene, 2,3-bis(dimethylamino)-1,4-phenylene, 2,5-bis(dimethylamino)-1,4-phenylene, 2-methyl-1,3-phenylene, 5-methyl-1,3-phenylene, 5-tertiary-butyl-1,3-phenylene, 2-methoxy-1,3-phenylene, 5-methoxy-1,3-phenylene, 2-nitro-1,3-phenylene, 5-nitro-1,3-phenylene, 2-dimethylamino-1,3-phenylene, or 5-dimethylamino-1,3-phenylene.

58. A perylene in accordance with claim 40 wherein aralkylene is 1,2-xylylene, 1,3-xylylene or 1,4-xylylene, wherein the perylene nucleii are bonded to the xylene via the methyl groups, 4,4'-diphenylmethylene, or 4,4'-diphenylisopropylidene.

59. A perylene in accordance with claim 40 wherein substituted aralkylene is 4,4'-diphenyl-1,1,1,3,3,3-hexafluoroisopropylidene.

60. A perylene pigment in accordance with claim 40 wherein R is hydrogen, alkyl, cycloalkyl, oxaalkyl, substituted alkyl, aryl, substituted aryl, aralkyl or a substituted aralkyl group, and X is 1,3-propylene, 2-hydroxy-1,3-propylene, 2-methoxy-1,3-propylene, 2-methyl-1,3-propylene or 2,2-dimethyl-1,3-propylene.

61. A perylene in accordance with claim 40 wherein R is methyl, ethyl, n-propyl, n-butyl, n-pentyl, n-hexyl, n-heptyl, or n-octyl, and X is a single nitrogen-nitrogen bond, ethylene, 1,4-tetramethylene, 1,5-pentamethylene, 1,6-hexamethylene, 1,7-heptamethylene, 1,8-octamethylene, 1,9-nonamethylene, 1,10-decamethylene, 1,11-undecamethylene or 1,12-dodecamethylene.

62. A perylene in accordance with claim 40 wherein R is methyl, ethyl, n-propyl, n-butyl, n-pentyl, n-hexyl, n-heptyl, or n-octyl, and X is 1,3-propylene, 2-hydroxy-1,3-propylene, 2-methoxy-1,3-propylene, 2-methyl-1,3-propylene or 2,2-dimethyl-1,3-propylene.

63. A perylene pigment in accordance with claim 40 wherein R is isopropyl, isobutyl, sec-butyl, 2-methylbutyl, 3-methylbutyl, 2-(3-methyl)butyl, 2-pentyl, 3-pentyl, neopentyl or cyclopentyl, and X is 1,3-propylene, 2-hydroxy-1,3-propylene, 2-methoxy-1,3-propylene, 2-methyl-1,3-propylene or 2,2-dimethyl-1,3-propylene.

64. A perylene pigment in accordance with claim 40 wherein R is 2-hydroxyethyl, 3-hydroxypropyl, 4-hydroxybutyl, 5-hydroxypentyl, 6-hydroxyhexyl, 2-methoxyethyl, 3-methoxypropyl or 4-methoxybutyl, and X is 1,3-propylene, 2-hydroxy-1,3-propylene, 2-methoxy-1,3-propylene, 2-methyl-1,3-propylene or 2,2-dimethyl-1,3-propylene.

65. An imaging member in accordance with claim 2 wherein X is propylene, and R is alkyl.

66. An imaging member in accordance with claim 2 wherein R is n-pentyl, and X is 1,3-propylene.

67. A perylene pigment in accordance with claim 40 wherein R is n-pentyl, and X is 1,3-propylene.

68. A method of imaging in accordance with claim 38 wherein R is n-pentyl, and X is 1,3-propylene.

69. A method of imaging in accordance with claim 39 wherein R is n-pentyl and X is 1,3-propylene.

70. A process for the preparation of diminic perylenes which comprises the reaction of a perylene monoimido anhydride with a symmetrical diamine.

71. A process in accordance with claim 70 wherein said reaction is accomplished by heating in the presence of a catalyst and in the presence of a solvent.

72. An imaging member in accordance with claim 29 wherein said amount is from about 35 to about 75 percent by weight.

73. An imaging member in accordance with claim 32 wherein said molecules are present in an amount of from about 20 to about 60 weight percent.

74. An imaging member in accordance with claim 32 wherein said molecules are present in an amount of from about 20 to about 60 weight percent.

75. An imaging member in accordance with claim 2 wherein R is n-propyl and X is 1,3-propylene.

76. An imaging member in accordance with claim 2 wherein R is n-propyl and X is 1,3-xlylene.

77. An imaging member in accordance with claim 2 wherein R is n-propyl and X is 4,4'-biphenylene.

78. An imaging member in accordance with claim 2 wherein R is n-pentyl and X is 1,4-phenylene.

79. An imaging member in accordance with claim 2 wherein R is 2-phenethyl and X is 1,3-propylene.

80. An imaging member in accordance with claim 2 wherein R is propyl and X is N—N when n is the number zero.

81. An imaging member in accordance with claim 2 wherein R is n-pentyl and X is 9,9-bis-(4-phenyl)fluorene.

82. An imaging member in accordance with claim 2 wherein R is n-butyl and X is 1,4-bis(4-phenoxy)benzene.

83. An imaging member in accordance with claim 2 wherein R is alkyl and X is alkylene.

* * * * *